(No Model.) 2 Sheets—Sheet 1.

G. G. STEGMANN.
Drier for Fruit, &c.

No. 230,207. Patented July 20, 1880.

Witnesses
Hugh Sangster
A. J. Sangster

Inventor
George G. Stegmann,
By James Sangster
Atty.

(No Model.) 2 Sheets—Sheet 2.
G. G. STEGMANN.
Drier for Fruit, &c.
No. 230,207. Patented July 20, 1880.
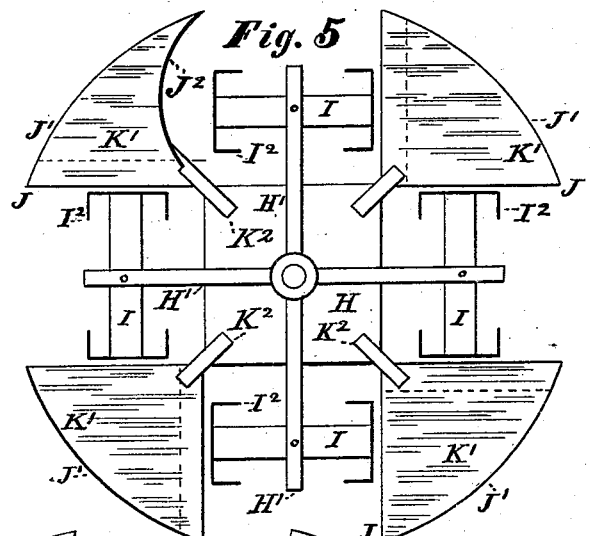
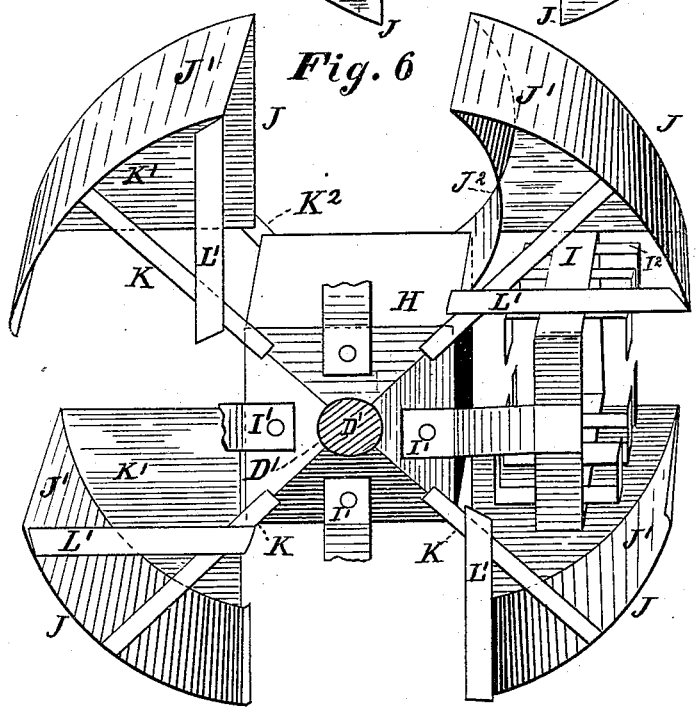
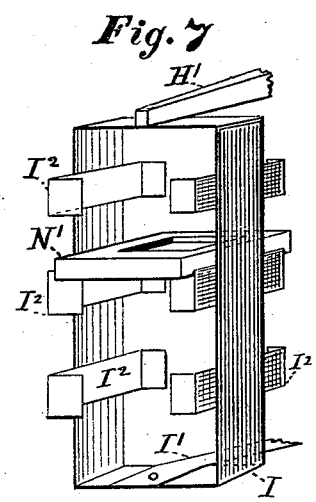
Witnesses.
Hugh Sangster
A. J. Sangster
Inventor.
George G. Stegmann,
By James Sangster
Atty.

UNITED STATES PATENT OFFICE.

GEORGE G. STEGMANN, OF LOCKPORT, NEW YORK.

DRIER FOR FRUIT, &c.

SPECIFICATION forming part of Letters Patent No. 230,207, dated July 20, 1880.

Application filed April 19, 1880. (No model.)

*To all whom it may concern:*

Be it known that I, GEORGE G. STEGMANN, a citizen of the United States, residing in Lockport, in the county of Niagara and State of New York, have invented certain new and useful Improvements in Driers for Drying Fruit or other Materials, of which the following is a specification.

The object of my invention is to provide the means for rapidly drying fruit or other similar materials; and it consists of a suitable case for inclosing the drying apparatus, a series of frames or racks for carrying the removable perforated trays, arranged between a series of air-cases, each air-case being provided with a deflecting-plate to direct the current of air upward as it revolves, and connected by framework around a box or case, through the center of which is rigidly fastened a vertical shaft having its upper and lower ends supported in bearings so as to turn easily, in combination with a suitable gearing to impart a rotary motion to the whole, as and for purposes which will be more clearly hereinafter shown by reference to the drawings, in which—

Figure 1:
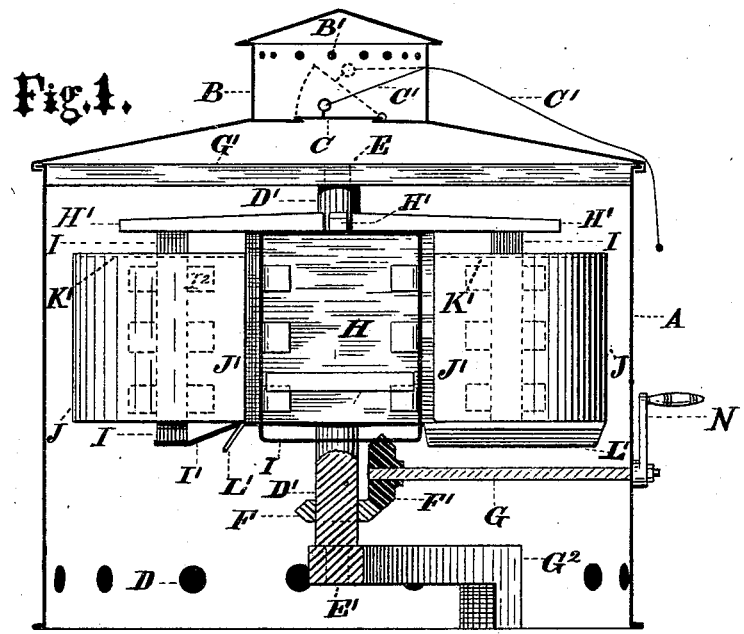
Figure 3:
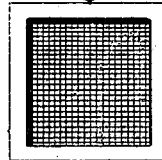
Figure 2:
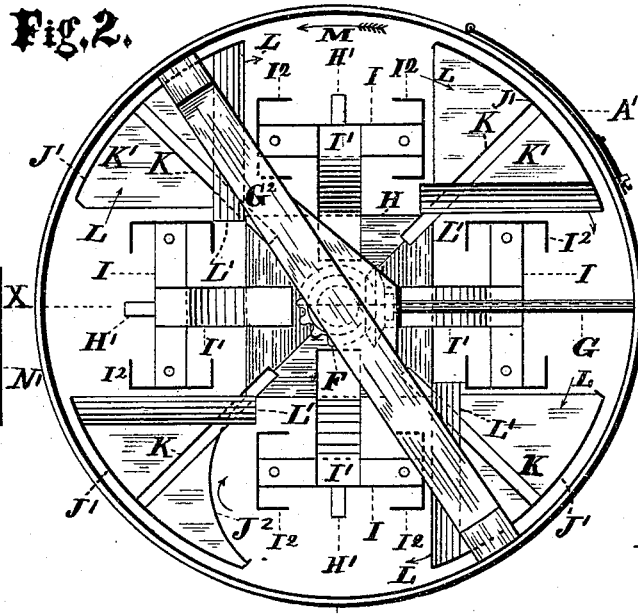
Figure 4:
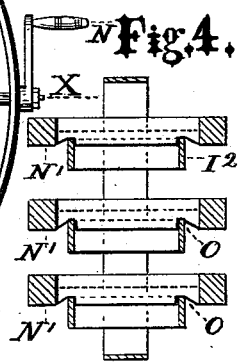

Figure 1 is a vertical longitudinal section through the outer case and through the driving-shaft gearing and a portion of the lower part of the vertical shaft in line X X, Fig. 2, showing the interior of the case and a side elevation of the rotary drying apparatus. Fig. 2 represents a bottom view of the drier complete. Fig. 3 is a top view of one of the drying-trays. Fig. 4 represents a vertical section through a series of trays and their supporting frames or racks. Fig. 5 is a perspective view of the rotary drying apparatus separate from the outer case, showing the tops of the air-cases, tray-racks, and their supporting-arms. Fig. 6 is also a perspective view, showing the under parts of the apparatus, the interior of the air-cases, and a similar view of one of the racks or tray-holders as connected thereto; and Fig. 7 is a perspective view of one of the racks or tray-holders and a similar view of one of the trays in position thereon.

A represents the outer case, which may be made either in the form of a cylinder, octagon, or other suitable shape. It is provided with a door, A', hinged thereto and fastened in the usual way, and is made large enough so that the trays may be passed in or out.

The top B is provided with holes B' for the air to pass out, and with a valve, C, (see Fig. 1,) controlled by a wire, chain, or a suitable cord, C', to regulate the passage of air outward. At the bottom is a series of openings, D, for the purpose of admitting cool air.

D' represents the vertical shaft. It is supported in bearings E E', and is provided with bevel-gear F, which engages with the gearing F' on the shaft G, the beam G' forming the upper bearing or support, and the beam $G^2$ being the lower support.

To the shaft D' is connected a box or case, H, which fills up the unoccupied space in the center and compels the heated air to pass around it and up through the material to be dried.

The letters H' represent arms also connected to the vertical shaft D', to which the tops of the rack-frames I are fastened, the bottoms of the same being fastened to and supported by arms or braces I'. (See Figs. 1 and 2.)

The air-cases, between which the racks $I^2$, for supporting the trays N', are arranged, are represented by letters J. They are closed on their outer sides or peripheries by a curved sheet or plate, J', and are fastened to the central case or box, H, at the top by bolts or any well-known means, and are connected thereto at the bottom by arms K. (Shown in Fig. 2.) They are also covered at the top by a thin plate, K', Fig. 2, (see, also, dotted lines K' in Fig. 1,) the whole being fastened to the central shaft so as to rotate with it.

The air-cases J are open on their inner sides, as shown by the arrows L in Fig. 2, and are provided with deflecting-plates L', which direct the heat upward into and out toward the center or box H, so that as the machine is in operation and turning in the direction of the arrow M, Fig. 2, the heat is utilized twice— first, by passing up through the material to be dried; second, by the said material passing through the heated air horizontally. In one or more of the cases J is fastened a curved sheet, $J^2$, extending from the box H to the outside plate J, as shown in Fig. 2. Its use is to prevent the steam from passing through the material to be dried after once passing over the heater.

N represents an ordinary handle for operating the machine by hand; but a pulley may be used instead when the machine is driven by steam-power.

N' represents the removable trays, having perforated bottoms, or bottoms of woven wire, as in Fig. 3, upon which the material to be dried is placed. They are arranged one above the other on the racks or arms I², as in Fig. 4, the lower sides of the tray-frames being provided with notches or grooves O, which fit the rack, as shown, so as to prevent them from being easily thrown off.

My invention may be used with any suitable and well-known heating device.

I claim as my invention—

1. A drier consisting of a central shaft, D', operated by a suitable gearing, substantially as specified, in combination with the box or case H, a series of racks for supporting the trays N', arranged alternately between a series of air-cases, J, and a series of deflecting-plates, L', the whole being connected together for joint operation as and for the purposes described.

2. In a drier, the combination of a central shaft, D', with a suitable tray-supporting device and a series of air-cases, J, substantially as and for the purposes specified.

GEORGE G. STEGMANN.

Witnesses:
R. W. ENGLISH,
I. B. SMITH.